US011913412B2

(12) United States Patent
Suzuki et al.

(10) Patent No.: US 11,913,412 B2

(45) Date of Patent: Feb. 27, 2024

(54) EGR VALVE AND EGR VALVE DEVICE PROVIDED WITH SAME

(71) Applicant: AISAN KOGYO KABUSHIKI KAISHA, Obu (JP)

(72) Inventors: Naoya Suzuki, Nagoya (JP); Koichi Sugihara, Chiryu (JP)

(73) Assignee: AISAN KOGYO KABUSHIKI KAISHA, Obu (JP)

(*) Notice: Subject to any disclaimer, the term of this patent is extended or adjusted under 35 U.S.C. 154(b) by 0 days.

(21) Appl. No.: 17/640,713

(22) PCT Filed: Aug. 18, 2020

(86) PCT No.: PCT/JP2020/031143
§ 371 (c)(1),
(2) Date: Mar. 4, 2022

(87) PCT Pub. No.: WO2021/054022
PCT Pub. Date: Mar. 25, 2021

(65) Prior Publication Data

US 2022/0316431 A1 Oct. 6, 2022

(30) Foreign Application Priority Data

Sep. 19, 2019 (JP) ................................. 2019-170217

(51) Int. Cl.
*F02M 26/68* (2016.01)
*F02M 26/72* (2016.01)

(52) U.S. Cl.
CPC ............ *F02M 26/68* (2016.02); *F02M 26/72* (2016.02)

(58) Field of Classification Search
CPC ............................... F02M 26/72; F02M 26/68
See application file for complete search history.

(56) References Cited

U.S. PATENT DOCUMENTS 3,385,052 A * 5/1968 Holtermann ............ F02B 27/00 60/314
3,981,283 A * 9/1976 Kaufman ............... F02M 26/58 123/568.27
(Continued)

FOREIGN PATENT DOCUMENTS

JP H09-42072 A 2/1997
JP 2001-355519 A 12/2001
(Continued)

OTHER PUBLICATIONS

Mar. 15, 2022 International Preliminary Report on Patentability issued in Patent Application No. PCT/JP2020/031143.
(Continued)

*Primary Examiner* — Carl C Staubach
(74) *Attorney, Agent, or Firm* — Oliff PLC

(57) ABSTRACT

A poppet-type EGR valve includes: a housing that includes a flow passage; a valve seat; a valve body allowed to be seated on the valve seat; a valve shaft on which the valve body is provided at one end section thereof; and a drive unit reciprocally driving the valve shaft. The flow passage has an inlet and an outlet and includes a bent passage portion that is bent downstream from the valve seat in a direction perpendicular to the direction toward the inlet. The bent passage portion includes at least one of a section in which the passage area is constant and a section in which the passage area increases toward the downstream direction, and does not include a section in which the passage area decreases toward the downstream direction. In the section in which the passage area increases toward the downstream direction, the passage area changes gradually.

16 Claims, 17 Drawing Sheets

(56) References Cited

U.S. PATENT DOCUMENTS

| | | | | |
|---|---|---|---|---|
| 4,635,609 | A * | 1/1987 | Seppen | F02M 26/19 123/527 |
| 5,511,531 | A * | 4/1996 | Cook | F02M 26/68 123/568.21 |
| 5,611,204 | A * | 3/1997 | Radovanovic | F02M 26/25 417/151 |
| 6,216,458 | B1 * | 4/2001 | Alger | F02M 26/05 60/605.2 |
| 10,337,449 | B2 * | 7/2019 | Hopf | F02F 1/4264 |
| 2001/0032631 | A1 * | 10/2001 | Cook | F02M 26/41 123/568.21 |
| 2002/0023630 | A1 * | 2/2002 | Balekai | F02M 26/32 123/568.17 |
| 2005/0199840 | A1 * | 9/2005 | Brinks | F16K 47/00 251/124 |
| 2012/0167862 | A1 * | 7/2012 | Nishimori | F16K 49/005 123/568.12 |
| 2014/0158098 | A1 * | 6/2014 | Asanuma | F02M 26/68 123/568.11 |
| 2014/0311464 | A1 * | 10/2014 | Sano | F02M 26/57 123/568.11 |
| 2015/0068504 | A1 * | 3/2015 | Hatano | F02M 26/54 123/568.26 |
| 2015/0128915 | A1 * | 5/2015 | Nakamura | F16K 1/54 123/568.11 |
| 2022/0333708 | A1 * | 10/2022 | Sugihara | F16K 27/029 |
| 2022/0372938 | A1 * | 11/2022 | Sugihara | F16J 15/06 |
| 2022/0389890 | A1 * | 12/2022 | Sugihara | F02M 26/67 |

FOREIGN PATENT DOCUMENTS

| | | | |
|---|---|---|---|
| JP | 2005-180379 | A | 7/2005 |
| JP | 2005-291201 | A | 10/2005 |
| JP | 2010-71190 | A | 4/2010 |
| JP | 2012-219684 | A | 11/2012 |
| JP | 2014-114715 | A | 6/2014 |
| JP | 2014-142136 | A | 8/2014 |
| JP | 2014-211189 | A | 11/2014 |
| JP | 2015-017506 | A | 1/2015 |
| JP | 2015-052283 | A | 3/2015 |
| JP | 2015-094275 | A | 5/2015 |
| JP | 2015-094328 | A | 5/2015 |
| WO | 2011/061795 | A1 | 5/2011 |

OTHER PUBLICATIONS

Sep. 15, 2020 International Search Report issued in Patent Application No. PCT/JP2020/031143.

Nov. 11, 2022 Office Action issued in Japanese Patent Application No. 2019-170217.

Nov. 22, 2023 Hearing Notice issued in Indian Application No. 202247012467.

* cited by examiner (E)

(F)

EGR VALVE AND EGR VALVE DEVICE PROVIDED WITH SAME

CROSS-REFERENCE

This is a national phase application filed under 35 U.S.C. 371 of PCT/JP2020/031143 filed on Aug. 18, 2020, which claims the benefit of priority from the prior Japanese Patent Application No. 2019-170217 filed on Sep. 19, 2019, the entire contents of which are incorporated herein by reference.

TECHNICAL FIELD

The present technique disclosed in this description relates to a poppet-type EGR valve to adjust a flow rate of EGR gas in an EGR passage and an EGR valve device provided with the same.

BACKGROUND ART

Heretofore, as this type of technique, for example, a poppet-type exhaust gas recirculation valve (EGR valve) described in the Patent Document 1 below has been known. As shown in a sectional view of FIG. 23, an EGR valve 61 is provided with a housing 63 including a passage 62 for EGR gas, a valve seat 64 provided in the passage 62, a valve element 65 allowed to be seated on the valve seat 64, a valve shaft 66 provided on its one end portion with the valve element 65, and a drive unit 67 to reciprocally drive the valve shaft 66 with the valve element 65. The passage 62 of the housing 63 includes an inlet 68 and an outlet 69. FIG. 24 is a perspective view showing an exterior view of the passage 62 and a first passage position A to a seventh passage position G in the passage 62. The passage 62 shown in FIG. 24 includes a bent passage portion 62*a* (indicated with a double chain-dot line) which is bent at a downstream side of the valve seat 64 in a direction orthogonal to a direction of the inlet 68.

FIG. 25 is a graph showing changes in passage areas of the respective passage positions A to G in the passage 62 shown in FIG. 24. This graph indicates its lateral axis with the respective passage positions A to G and its vertical axis with the passage area. As shown in FIG. 24 and FIG. 25, the passage 62 downstream of the valve seat 64 has a shape such that its passage area is once increased (a second passage position B to a fourth passage position D), reduced thereafter (the fourth passage position D to a sixth passage position F), and then increased again (the sixth passage position F and the seventh passage position G).

RELATED ART DOCUMENTS

Patent Documents

Patent Document 1: JP 2015-052283A

SUMMARY OF INVENTION

Problems to be Solved by the Invention

However, the EGR valve 61 described in the Patent Document 1 has a problem about a shape of the passage 62 downstream of the valve seat 64. Specifically, the passage area of the passage 62 is once increased and reduced thereafter, and increased again toward the downstream direction, and this configuration tends to cause increase in pressure loss in the passage 62. Therefore, a maximum flow rate of the EGR gas cannot be increased by that increased amount of the pressure loss. To address this, it is considered that each diameter of the valve seat 64 and the valve element 65 is increased in order to increase the maximum flow rate of the EGR gas in the passage 62, but this increase in the diameter of the valve seat 64 and the valve element 65 could cause increase in a size of the EGR valve 61.

This disclosure has been made in view of the above circumstances and has a purpose of providing an EGR valve which achieves increase in a maximum flow rate of EGR gas without increasing a frame size of an EGR valve such as increase in each diameter of a valve seat and a valve element, and an EGR valve device provided with the same.

Means of Solving the Problems (1) To achieve the above purpose, one aspect of the present invention provides an EGR valve of a poppet type comprising: a housing including a passage for EGR gas; a valve seat provided in the passage, the passage having an inlet and an outlet and including a bent passage portion bent orthogonally with respect to a direction toward the inlet downstream of the valve seat; a valve element allowed to be seated on the valve seat; a valve shaft provided on its one end with the valve element; and a drive unit to reciprocally drive the valve shaft; wherein the bent passage portion includes only at least any one of a portion having a passage area which is kept constant toward a downstream direction and a portion having a passage area which increases toward the downstream direction.

According to the above configuration (1), the bent passage portion configuring a passage of the housing includes only at least any one of a portion having a constant passage area toward the downstream direction and a portion increasing its passage area toward the downstream direction, and includes no portion decreasing its passage area toward the downstream direction. Therefore, pressure loss in the bent passage portion is reduced.

(2) To achieve the above purpose, in the above configuration (1), preferably, the portion increasing its passage area toward the downstream direction is configured to be gradually changed with its passage area.

According to the above configuration (2), in addition to the operation of the above configuration (1), the portion of the bent passage portion increasing its passage area toward the downstream direction is gradually changed its passage area, and accordingly, the EGR gas flows smoothly toward the downstream direction.

(3) To achieve the above purpose, in the above configuration (1) or (2), preferably, the housing is configured by resin material in at least the bent passage portion.

According to the above configuration (3), in addition to the operation of the above configuration (1) or (2), the portion of the housing at least including the bent passage portion is formed of the resin material, and thus the housing can be formed with a thin thickness as compared with a housing formed of metal material, and the housing can increase its corrosion resistance to condensed water which is to be generated in the passage.

(4) To achieve the above purpose, in any one of the above configurations (1) to (3), preferably, the passage downstream of the valve seat includes the bent passage portion and an outlet passage portion continuing into the outlet downstream of the bent passage portion, the housing includes the outlet passage portion, an outer housing having an insertion hole intersecting the outlet passage portion, and an inner housing fitted in the insertion hole of the outer housing and having the bent passage portion and an inlet passage portion continuing into the inlet upstream of the valve seat, and a sealing member is provided between the insertion hole of the outer housing and an outer circumference of the inner housing.

According to the above configuration (4), in addition to the operation of any one of the above configurations (1) to (3), the housing is configured with two bodies of the outer housing and the inner housing, and thus it is possible to give respective functions to the outer housing and the inner housing. For example, the inner housing formed of resin material can be made with a thin thickness to enlarge the passage, and the outer housing can be formed of metal material for ensuring strength. Further, the sealing member is provided between the outer housing and the inner housing, and thereby infiltration of the EGR gas between the outer housing and the inner housing can be restrained.

(5) To achieve the above purpose, preferably, there is provided a EGR valve device comprising: the EGR valve according to any one of claims 1 to 4; and an object member to be assembled with the housing of the EGR valve, wherein the object member includes an assembling hole and an other passage, and the inlet and the outlet of the housing are communicated with the other passage in a state in which the housing is assembled with the assembling hole of the object member.

According to the above configuration (5), in addition to the operations of the EGR valve according to any one of the above configurations (1) to (4), the housing of the EGR valve is assembled to the assembling hole of the object member to join the EGR valve with the object member. Accordingly, an annexed configuration for assembling is omitted from the EGR valve, so that a space can be left out by that annexed configuration. Further, the EGR valve can be commonized to be assembled to various types of object members.

Effects of the Invention

According to the above configuration (1), in the EGR valve, a maximum flow rate of EGR gas can be increased without enlarging a frame size of the EGR valve by enlarging each diameter of a valve seat and a valve element, for example.

According to the above configuration (2), in the EGR valve, the maximum flow rate of the EGR gas can be increased without enlarging the frame size of the EGR valve by enlarging each diameter of the valve seat and the valve element, for example.

According to the above configuration (3), in addition to an effect of the above configuration (1) or (2), enlargement in a passage of a EGR valve and improvement in a stability of a flow rate characteristic can be achieved.

According to the above configuration (4), in addition to the effects of any one of the above configurations (1) to (3), the EGR valve can achieve ensuring a function with a minimum frame size and further achieve enlargement in the passage without enlarging the frame size of the EGR valve.

According to the above configuration (5), in addition to the effects of any one of the above configurations (1) to (4), the EGR valve can achieve enlargement in the passage by the omitted space and further achieve improvement in versability of the EGR valve to the various object members.

MODE FOR CARRYING OUT THE INVENTION

Some embodiments embodying an EGR valve and an EGR valve device provided with the same are explained below in detail with reference to the accompanying drawings.

First Embodiment

Firstly, a first embodiment embodying the EGR valve is explained.

(Configuration of EGR Valve)

Figure 1:
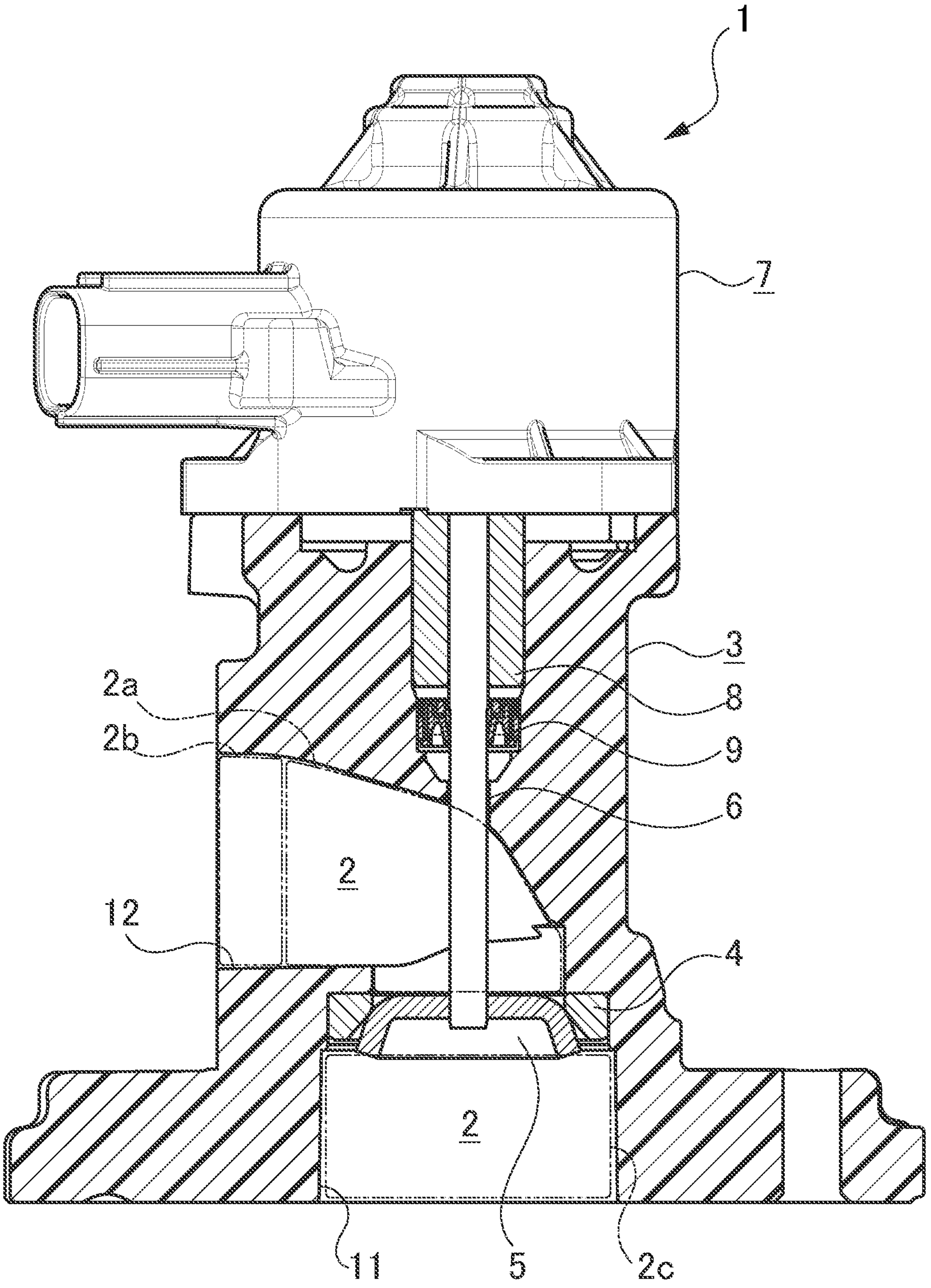
FIG. 1 is a partly cutaway front view of an EGR valve in a first embodiment.
Figure 2:
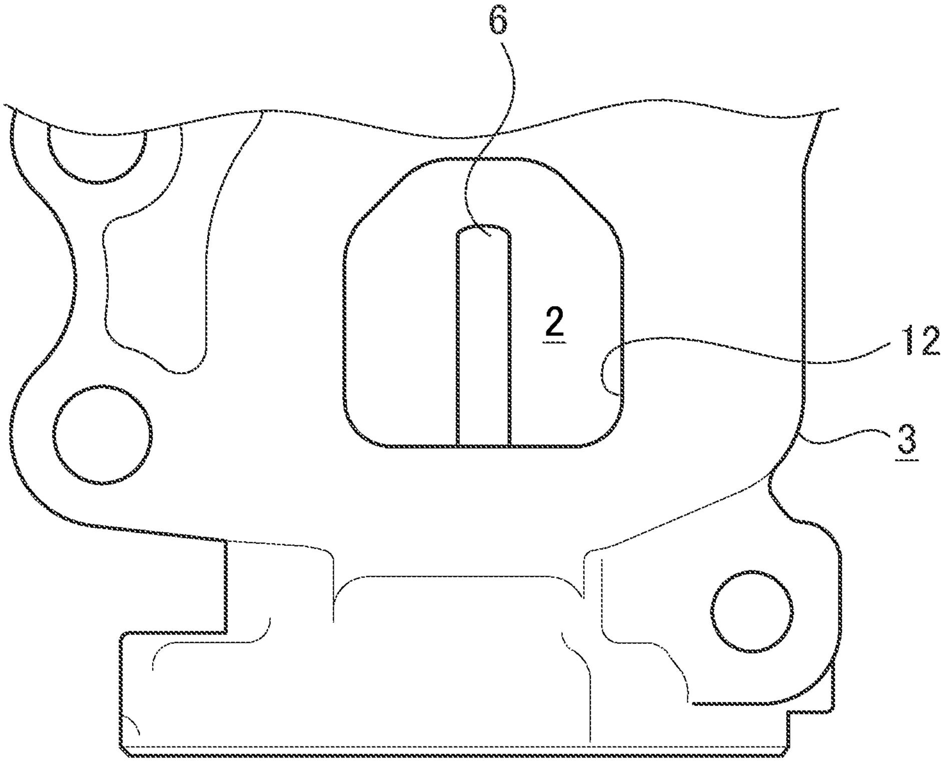
FIG. 2 is a schematic view of a part of a housing when it is seen from a side of an outlet of a passage in the first embodiment.

FIG. 1 is a partly cutaway front view of an EGR valve 1 in this embodiment. FIG. 2 is a view showing a part of a housing 3 when it is seen from a side of an outlet 12 of a passage 2. The EGR valve 1 is provided in an EGR passage (not shown) through which a part of exhaust air to be discharged to an exhaust passage from an engine is recirculated into the engine as EGR gas. The EGR valve 1 is used for adjusting a flow rate of the EGR gas in the EGR passage.

As shown in FIG. 1, the EGR valve 1 has a structure of a poppet-type valve and includes the housing 3 including the passage 2 for the EGR gas, an annular valve seat 4 provided in a middle portion of the passage 2, a valve element 5 of an almost umbrella-like shape allowed to be seated on the valve seat 4, a valve shaft 6 provided on one end portion with the valve element 5, and a drive unit 7 to reciprocally drive the valve shaft 6 with the valve element 5. The drive unit 7 is, for example, configured by a DC motor. FIG. 1 is a sectional view except the drive unit 7. The valve seat 4 is formed separately from the housing 3 and assembled to a mid-portion in the passage 2. The housing 3 is configured by resin material, and the valve seat 4 and the valve element 5 are configured by metal material. Each shape of the valve seat 4 and the valve element 5 is only an example. This EGR valve 1 is configured to move the valve element 5 with respect to the valve seat 4 to change an open degree from the valve seat 4 such that the flow rate of the EGR gas in the passage 2 is adjusted. In the present embodiment, detailed explanation about the drive unit 7 is omitted.

As shown in FIG. 1, the drive shaft 6 extends downward from the drive unit 7 and is vertically fitted in the housing 3. The valve shaft 6 is placed in parallel with an axis of the valve seat 4. The valve element 5 is made to be seated (contacted) and separated with respect to the valve seat 4 by reciprocal driving of the valve shaft 6. Between the housing 3 and the valve shaft 6, a thrust bearing 8 to support reciprocal movement of the valve shaft 6 is provided. Between the housing 3 and the valve shaft 6, a lip seal 9 for sealing the housing 3 and the valve shaft 6 is provided adjacent to a lower end of the thrust bearing 8. In the present embodiment, the valve element 5 is placed on a lower side (on an upstream side) of the valve seat 4 and allowed to be seated on the valve seat 4.

(Configuration of Passage)

As shown in FIG. 1, the passage 2 of the housing 3 includes an inlet 11 and the outlet 12. The passage 2 is provided on its upper side (on a downstream side) of the valve seat 4 with a bent passage portion 2*a* (indicated with a double-dashed chain-dot line) that is bent orthogonally with respect to a direction toward the inlet 11. The passage 2 downstream of the valve seat 4 is, other than the bent passage portion 2*a*, provided with an outlet passage portion 2*b* (indicated with another double-dashed chain-dot line) continuing into the outlet 12 downstream of the bent passage portion 2*a*. The passage 2 upstream of the valve seat 4 includes an inlet passage portion 2*c* (indicated with another double-dashed chain-dot line) continuing into the inlet 11.

Figure 3:
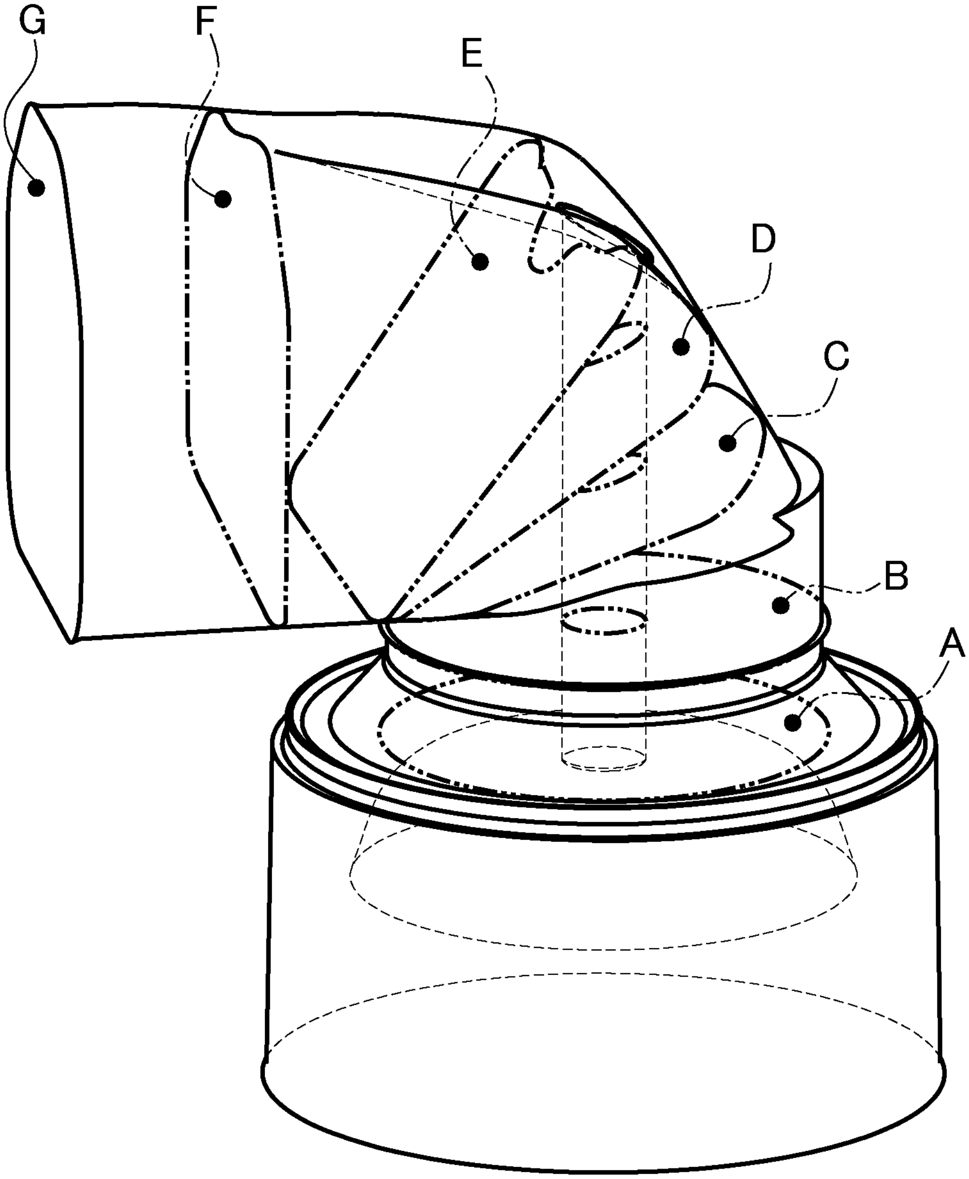
FIG. 3 is a perspective view showing a part of external view of the passage of the housing and first to seventh passage positions in the passage in the first embodiment.
Figure 4:
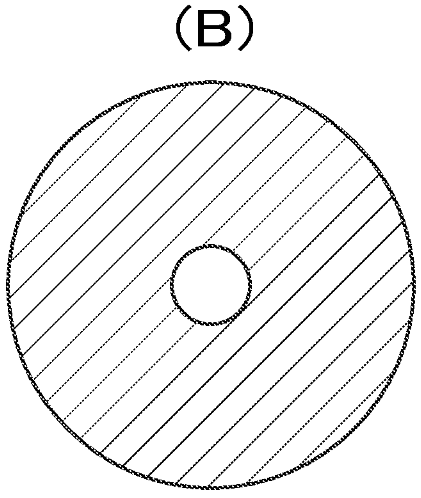
FIG. 4 is a sectional view showing a passage section of a second passage position in the first embodiment.
Figure 5:
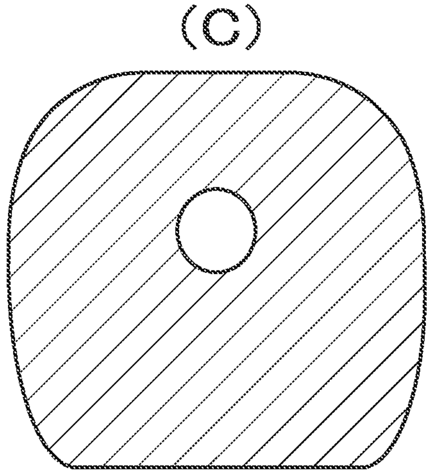
FIG. 5 is a sectional view showing a passage section of a third passage position in the first embodiment.
Figure 6:
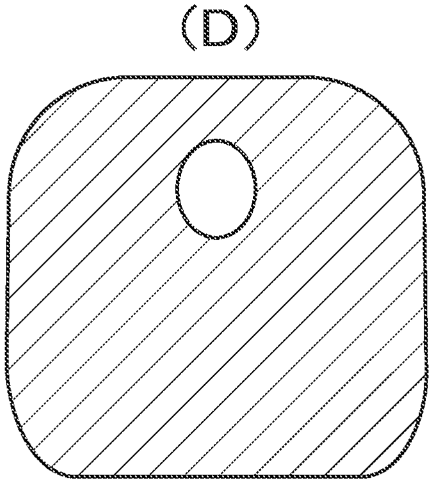
FIG. 6 is a sectional view showing a passage section of a fourth passage position in the first embodiment.
Figure 7:
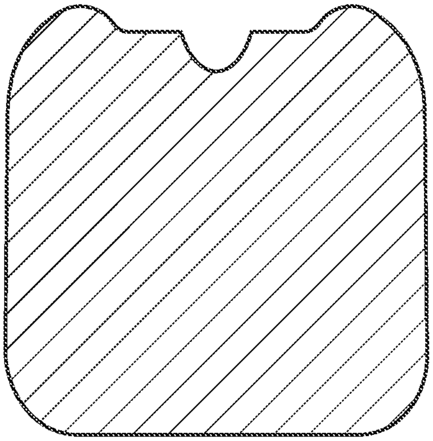
FIG. 7 is a sectional view showing a passage section of a fifth passage position in the first embodiment.
Figure 8:
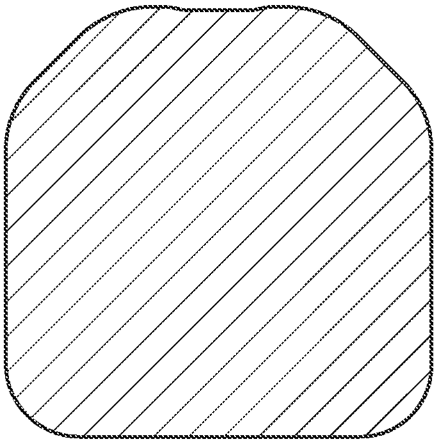
FIG. 8 is a sectional view showing a passage section of a sixth passage position in the first embodiment.

FIG. 3 is a perspective view showing a part of external appearance of the passage 2 of the housing 3 and a first passage position A to a seventh passage position G of the passage 2. In FIG. 3, reference signs "A to F" represent different passage positions in the passage 2 of the housing 3 between the inlet 11 of the valve seat 4 to the outlet 12 of the passage 2. Herein, the first passage position A corresponds to a position of an inlet of the valve seat 4, and the second passage position B corresponds to a position of an outlet of the valve seat 4 and also to a position of an inlet of the bent passage portion 2*a*. A sixth passage position F corresponds to a position of an outlet of the bent passage portion 2*a*. A third passage position C to a fifth passage position E represent different positions in a mid-portion of the bent passage portion 2*a*. The seventh passage position G corresponds to a position of the outlet 12 of the passage 2.

Figure 9:
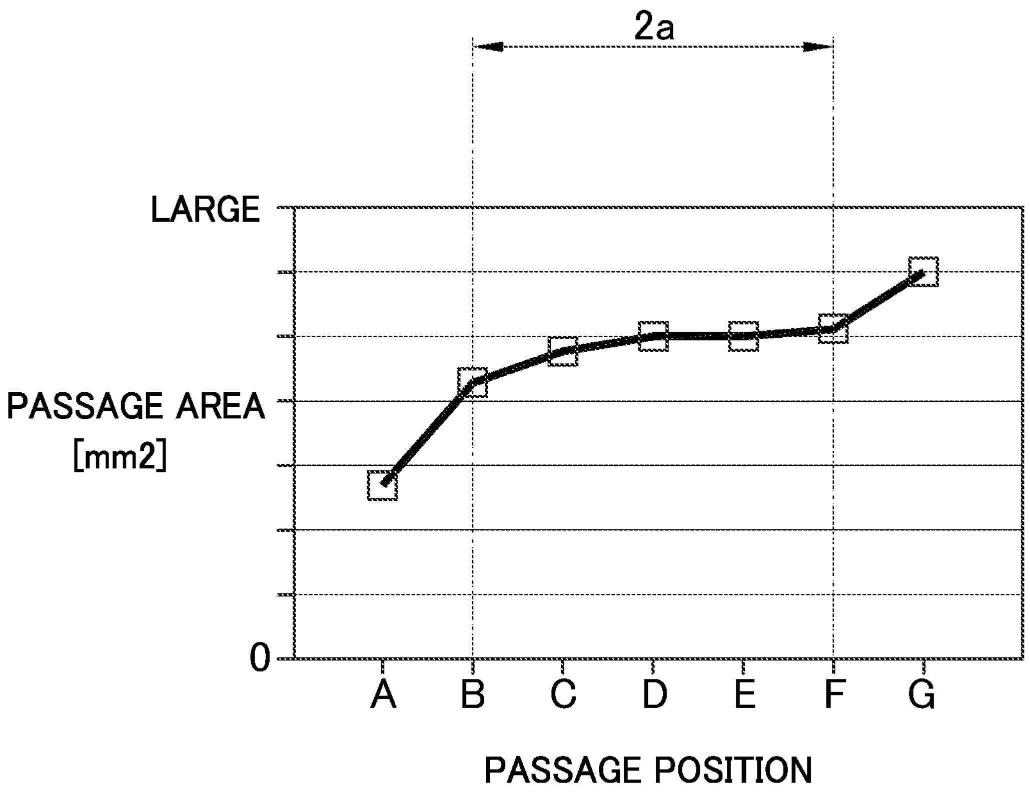
FIG. 9 is a graph showing changes in passage areas in the first to the seventh passage positions in the first embodiment.

FIG. 4 to FIG. 8 show passage sections of the second passage position B to the sixth passage position F, respectively. FIG. 9 is a graph showing changes in passage areas of the first passage position A to the seventh passage position G. In FIG. 9, the second passage position B to the sixth passage position F correspond to the bent passage portion 2*a*. It is understood that the passage areas succeeding the second passage position B to the seventh passage position G are all larger than the passage area of the second passage position B, and the passage areas of the second passage position B to the seventh passage position G gradually increase their passage areas in this order. Herein, in the bent passage portion 2*a* from the second passage position B to the sixth passage position F, the passage area only includes a portion (the second passage position B to a fourth passage position D) increasing its passage area toward a downstream direction and a portion (the fourth passage position D to the sixth passage position F) having a constant passage area toward the downstream direction, and the bent passage portion 2*a* is formed to have no portion decreasing its passage area toward the downstream direction. Further, in this bent passage portion 2*a*, a portion increasing its passage area in the downstream direction (the second passage position B to the fourth passage position D) is arranged to change the passage area in a gentle manner.

(Operations and Effects of EGR Valve)

According to the above-mentioned configuration of the EGR valve 1 of the present embodiment, the valve shaft 6 is driven with the valve element 5 by the drive unit 7 to move the valve element 5 with respect to the valve seat 4. Thus, the opening area (the open degree) between the valve seat 4 and the valve element 5 changes, so that the flow rate of the EGR gas in the passage 2 is adjusted. Herein, according to the configuration of this EGR valve 1, the bent passage portion 2*a* configuring the passage 2 of the housing 3 only includes the portion (the second passage position B to the fourth passage position D) increasing its passage area toward the downstream direction and the portion (the fourth passage position D to the sixth passage position F) having the constant passage area toward the downstream direction, and has no portion decreasing its passage area toward the downstream direction. Accordingly, pressure loss in the bent passage portion 2*a* is reduced. Therefore, as for the EGR valve 1, a maximum flow rate of the EGR gas can be increased without enlarging a frame of the EGR valve by, for example, enlarging each diameter of the valve seat 4 and the valve element 5.

According to the configuration of the present embodiment, in the portion (the second passage position B to the fourth passage position D) increasing its passage area of the bent passage portion 2*a* toward the downstream direction, the passage area gradually changes, and thus the EGR gas flows smoothly toward the downstream direction. In this meaning, too, as for the EGR valve 1, the maximum flow rate of the EGR gas can be increased without enlarging the frame of the EGR valve by, for example, enlarging each diameter of the valve seat 4 and the valve element 5.

Herein, when a discharge coefficient and a maximum flow rate of the EGR gas is measured as for an EGR valve in a conventional art, the discharge coefficient is "0.61" and the maximum flow rate is "720 (liter/minute)" as one example.

On the other hand, when the discharge coefficient and the maximum flow rate of the EGR gas is measured with the EGR valve 1 of the present embodiment in which each diameter of the valve seat 4 and the valve element 5 is made as the same with the one in the conventional art, the discharge coefficient is "0.84" and the maximum flow rate is "890 liter/minute" as one example. Namely, in the present embodiment, the maximum flow rate can be increased by "23%" without enlarging the diameter of the valve seat 4 and the valve element 5 from the conventional art.

Further, according to the configuration of the present embodiment, the housing 3 including the passage 2 is configured by resin material, and thus the housing 3 can be made with a thin thickness as compared with a housing configured with metal material, and further, the housing 3 increases its corrosion resistance against condensed water which is to be generated in the passage 2. Therefore, it is possible to achieve enlargement in the passage 2 and improvement in the flow rate characteristics of the EGR valve 1.

Second Embodiment

Next, a second embodiment embodying an EGR valve is explained. In the following explanation, similar configuration to those of the first embodiment is assigned with the same reference signs as those in the first embodiment and their explanations are omitted, and the following explanation is made with a focus on the differences from the first embodiment.

(Configuration of EGR Valve)

Figure 10:
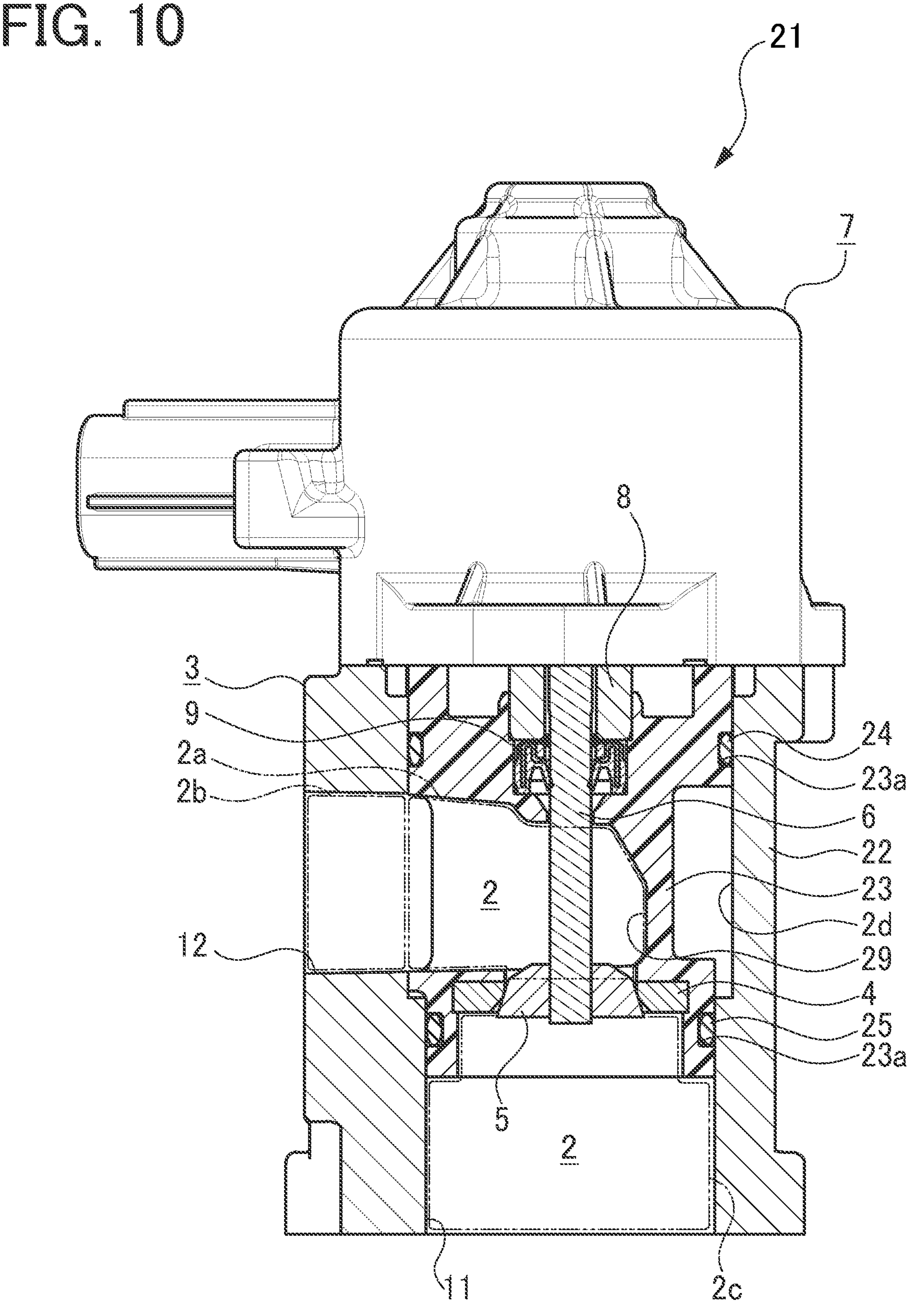
FIG. 10 is a partly cutaway front view of an EGR valve in a second embodiment.
Figure 11:
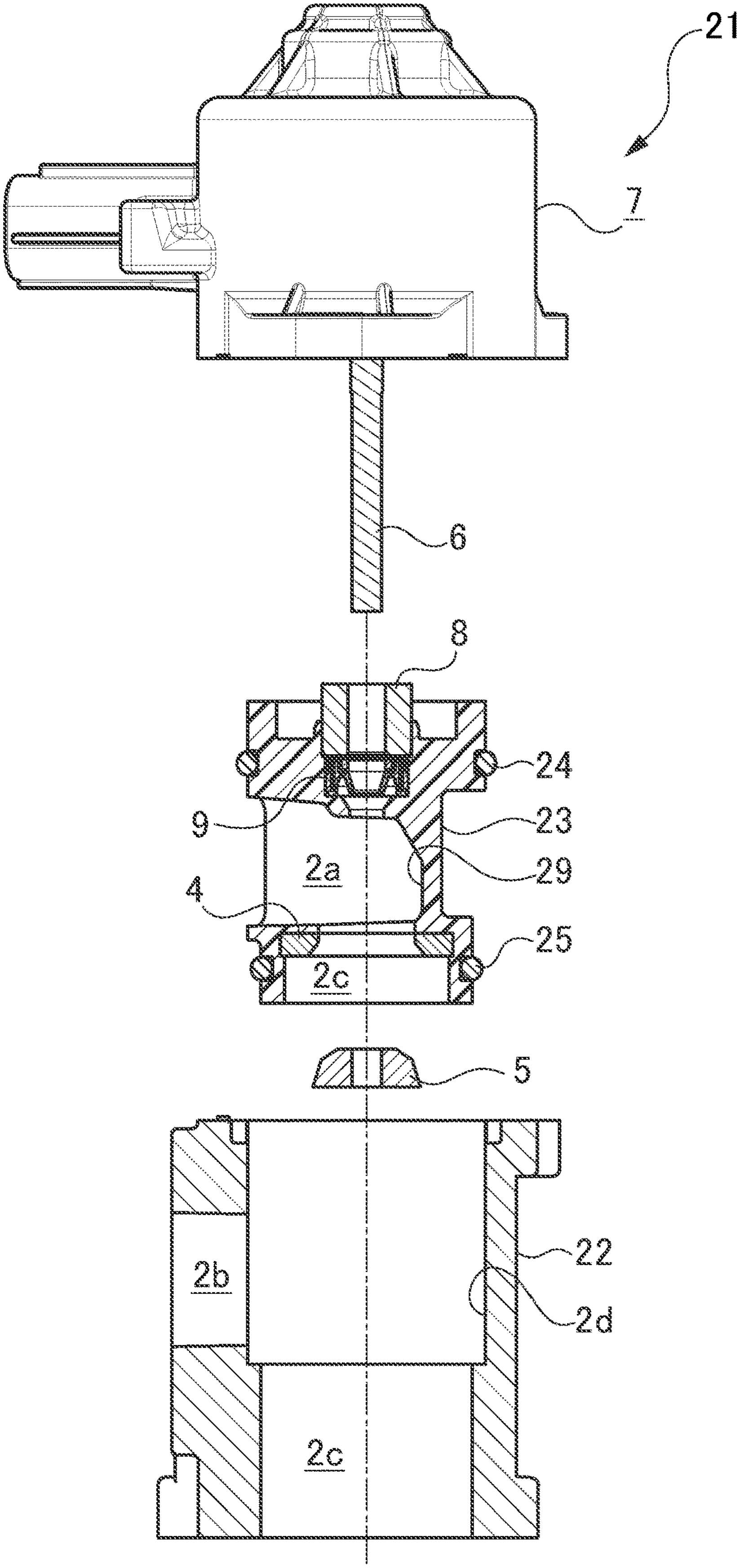
FIG. 11 is a partly exploded cutaway front view of the EGR valve in the second embodiment.

FIG. 10 is a partly cutaway front view of an EGR valve 21 in the present embodiment. FIG. 11 is a partly cutaway and exploded front view of the EGR valve 21. The present embodiment is mainly different from the first embodiment in its configuration of the housing 3.

As shown in FIG. 10, the EGR valve 21 is different from the valve in the first embodiment in its shape and the like to some extent, but the EGR valve 21 is similarly provided with the housing 3 which includes the passage 2, the valve seat 4, the valve element 5, the valve shaft 6, and the drive unit 7.

As shown in FIG. 10, the passage 2 in the housing 3 includes an inlet passage portion 2*c*, a bent passage portion 2*a*, and an outlet passage portion 2*b* in this order in a direction from an inlet 11 to an outlet 12. In the present embodiment, as shown in FIG. 11, the housing 3 is configured with two bodies of an outer housing 22 and an inner housing 23. The outer housing 22 includes the outer passage portion 2*b* and an insertion hole 2*d* intersecting the outlet passage portion 2*b*. This insertion hole 2*d* constitutes a part of the inlet passage portion 2*c* that continues to the inlet 11 upstream of the valve seat 4. The inner housing 23 includes the above-mentioned bent passage portion 2*a* and a part of the inlet passage portion 2*c* continuing to the inlet 11 upstream of the valve seat 4. Then, the inner housing 23 is fitted in the insertion hole 2*d* of the outer housing 22, so that the housing 3 is constituted. In the present embodiment, the inner housing 23 is configured by resin material and the outer housing 22 is configured by metal material (for example, aluminum). There are provided between the insertion hole 2*d* of the outer housing 22 and an outer circumference of the inner housing 23 with a first sealing member 24 and a second sealing member 25. The two sealing members 24 and 25 are configured with rubber-made O-rings. The first sealing member 24 is provided on the outer circumference of the inner housing 23 above the bent passage portion 2*a* of the passage 2. The second sealing member 25 is provided on the outer circumference of the inner housing 23 below the valve seat 4. Both the sealing members 24 and 25 are joined to circumferential grooves 23*a* formed on the outer circumference of the inner housing 23, respectively.

Figure 12:
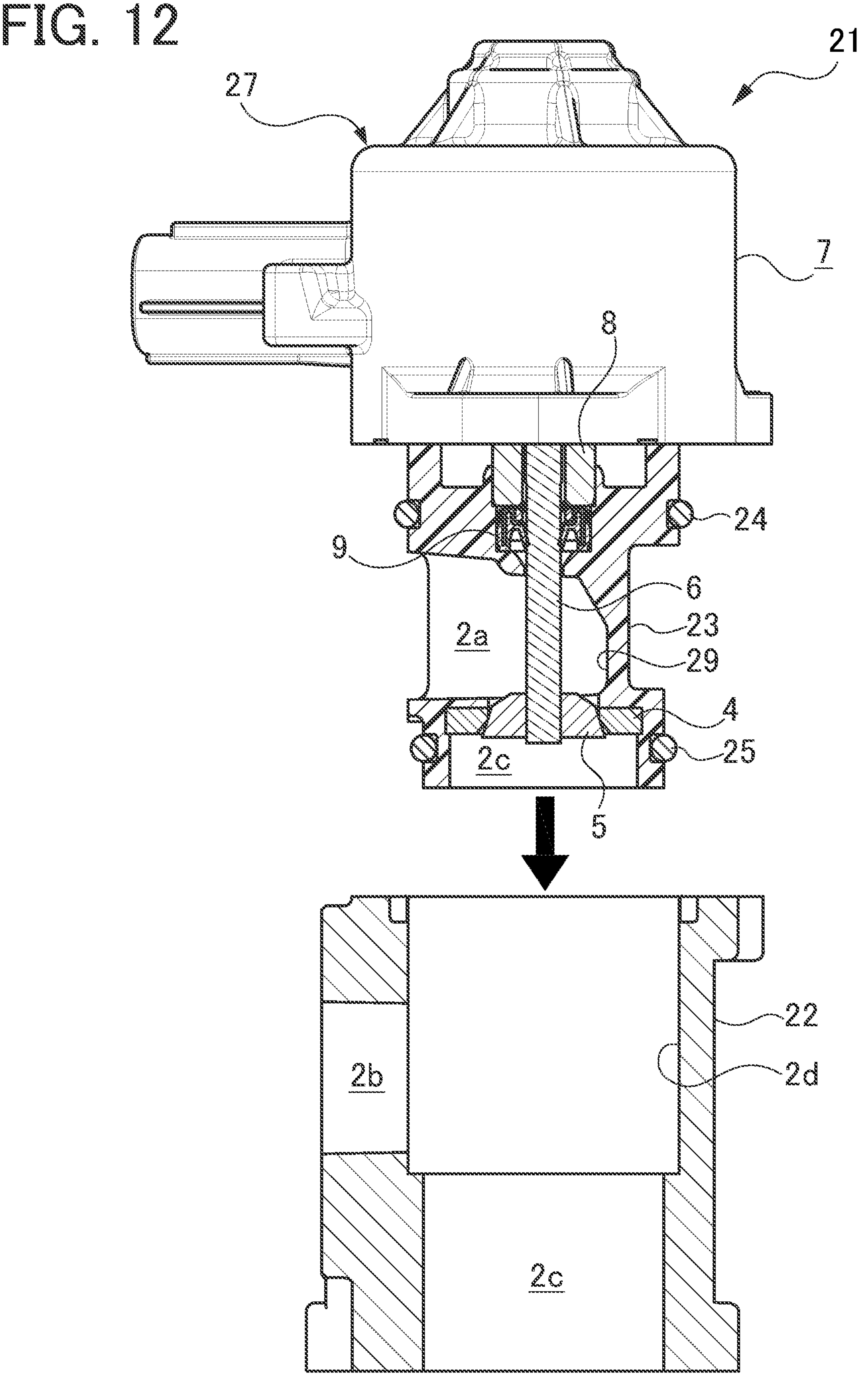
FIG. 12 is a partly cutaway front view showing a part of a manufacturing process for the EGR valve in the second embodiment.

FIG. 12 is a partly cutaway front view of a part of a manufacturing process of the EGR valve 21. As shown in FIG. 12, for manufacturing this EGR valve 21, the drive section 7 (including the valve shaft 6 and others) manufactured in advance, the inner housing 23, the valve seat 4, the valve element 5, and the first and second sealing members 24 and 25 are assembled to one another to configure an assembly 27. Thereafter, this assembly 27 is joined to the outer housing 22. Specifically, the inner housing 23 of the assembly 27 is fitted in (drop-in fitting) the insertion hole 2*d* of the outer housing 22. At this time, the bent passage portion 2*a* and the outlet passage portion 2*b* which configure the passage 2 are made to be communicated between the inner housing 23 and the outer housing 22. Further, the inlet passage portion 2*a* of the inner housing 23 is made to be communicated with the insertion hole 2*d* of the outer housing 22. Thus, the EGR valve 21 shown in FIG. 10 is obtained.

(Configuration of Passage)

Figure 13:
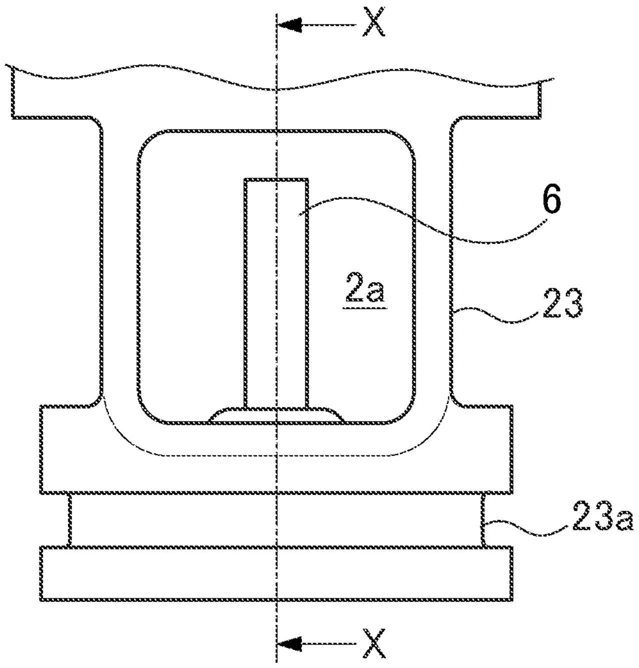
FIG. 13 is a schematic view of a part of an inner housing when it is seen from an outlet side of a bent passage portion in the second embodiment.
Figure 14:
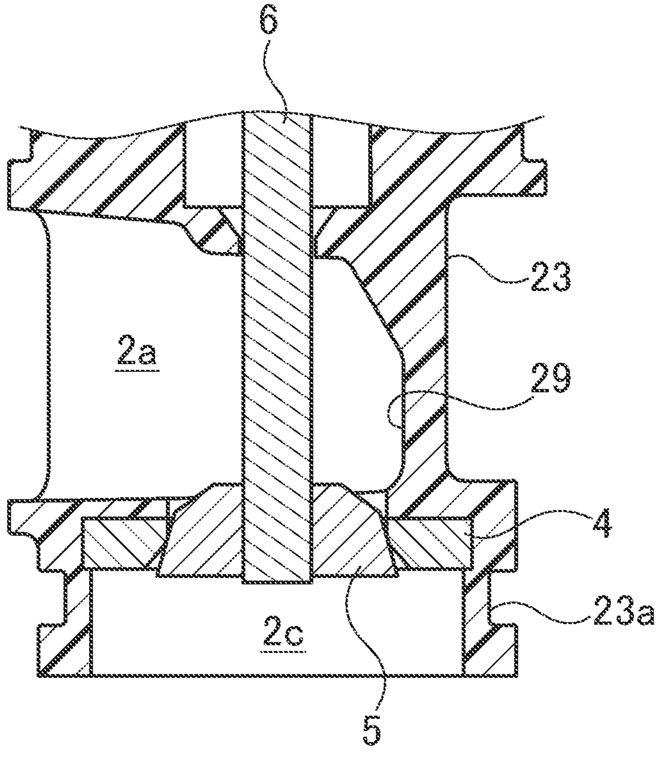
FIG. 14 is a sectional view of the inner housing taken along a line X-X in FIG. 13 in the second embodiment.

FIG. 13 is a view showing a part of the inner housing 23 when it is seen from an outlet side of the bent passage portion 2*a*. FIG. 14 is a sectional view of the inner housing 23 taken along a line X-X in FIG. 13. As shown in FIG. 14, in the present embodiment, the bent passage portion 2*a* includes a dent 29 protruding in a direction opposite to a direction toward the outlet 12 with reference to the valve shaft 6.

Figure 15:
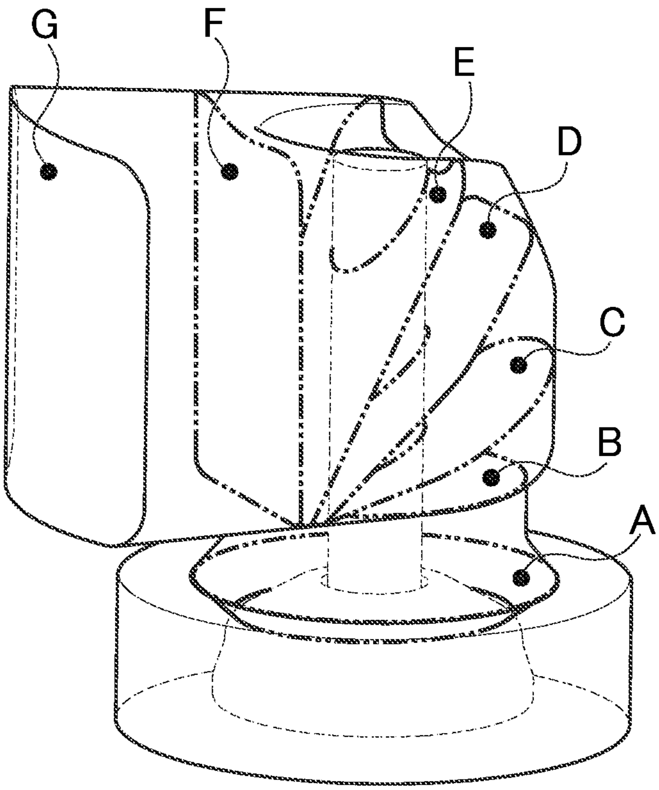
FIG. 15 is a perspective view showing a part of an external view of the passage of the inner housing and first to seventh passage positions in the passage in the second embodiment.
Figure 16:
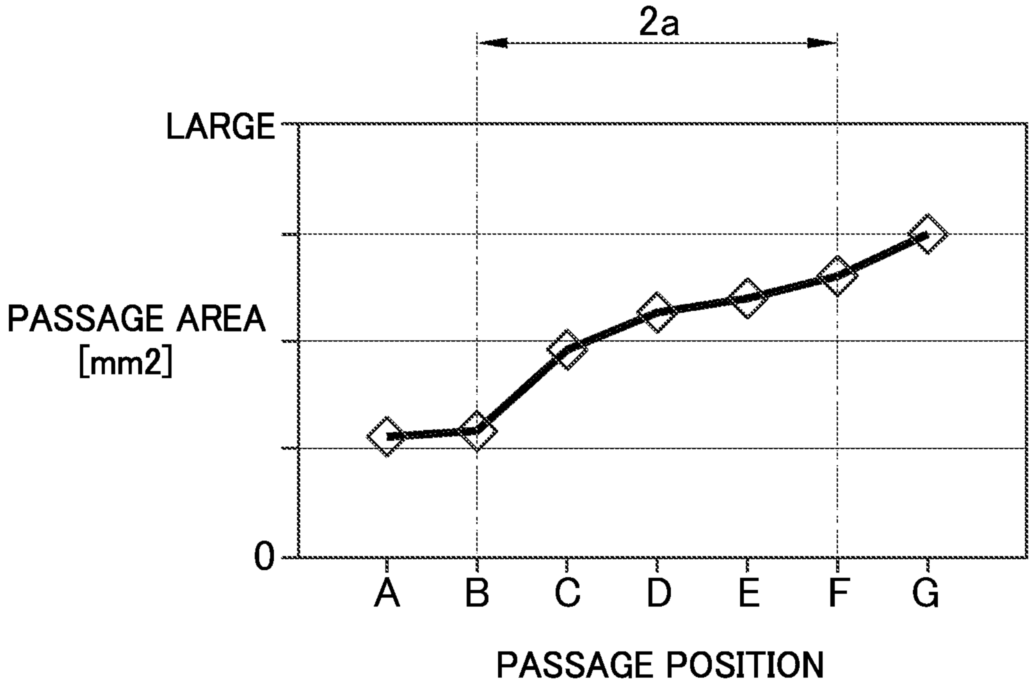
FIG. 16 is a graph showing changes in the passage areas in the first to the seventh passage positions in the second embodiment.

FIG. 15 is a perspective view of an external appearance of a part of the passage 2 in the inner housing 23 and a first passage position to a seventh passage position in the passage 2. In FIG. 15, the first passage position A to the seventh passage position G indicate respective passage positions from an inlet of the valve seat 4 to an outlet of the passage 2 in a range of the passage 2 in the inner housing 23. FIG. 16 is a graph showing changes in passage areas of the first passage position A to the seventh passage position G. In FIG. 16, a second passage position B to a sixth passage position F correspond to the bent passage portion 2*a*. As shown in FIG. 16, it is confirmed that the respective passage areas succeeding the second passage position B to the sixth passage position F of the bent passage portion 2*a* are all larger than the passage area of the second passage position B and the passage areas are gradually increased. Herein, in the bent passage portion 2*a* from a third passage position C to the seventh passage position G, the passage area is made to only include an increased portion (the second passage position B to the sixth passage position F) toward a downstream direction and include no decreasing portion toward the downstream direction. Further, in this bent passage portion 2*a*, a portion (the second passage position B to the sixth passage position F) increasing its passage area toward the downstream direction is arranged to change its passage area in a relatively gentle manner.

Herein, the dent 29 in the bent passage portion 2*a* is expediently formed in association with molding the bent passage portion 2*a* having a smooth inner surface by a metal die during manufacturing of the inner housing 23, and thus it is preferable to set the dent 29 with a minimum size.

(Operations and Effects of EGR Valve)

According to the above-explained configuration of the EGR valve 21 in the present embodiment, the following operations and effects can be obtained in addition to the operations and effects of the first embodiment. Namely, the housing 3 is configured by two bodies of the outer housing 22 and the inner housing 23, and thus, the outer housing 22 and the inner housing 23 can have separate functions. For example, the inner housing 23 configured by the resin material for the purpose of enlarging the passage 2 can be made with a thin thickness, and the outer housing 22 can be configured by metal material for assuring its strength. Further, there are provided the sealing members 24 and 25 between the outer housing 22 and the inner housing 23, so that intrusion of the EGR gas between the outer housing 22 and the inner housing 23 can be restrained. Therefore, the EGR valve 21 can achieve assurance of its functions with a minimum frame size, and furthermore, the passage 2 can be enlarged without enlarging the frame of the EGR valve 21.

Further, according to the configuration of the present embodiment, the housing 3 is configured with the inner housing 23 made of the resin material and the outer housing 22 made of the metal material, and thus the housing 3 can achieve weight reduction as compared with a housing which is entirely configured by the metal material. Furthermore, the inner housing 23 configuring a large portion of the passage 2 is configured with the resin material, and thus the housing 3 is increased with its corrosion resistance against the condensed water which is to be generated in the passage 2. Therefore, the EGR valve 21 can achieve weight reduction and improvement in the endurability.

Third Embodiment

Next, a third embodiment embodying an EGR valve is explained. The present embodiment is different from the first embodiment in its configuration of the housing 3.

(Configuration of EGR Valve)

Figure 17:
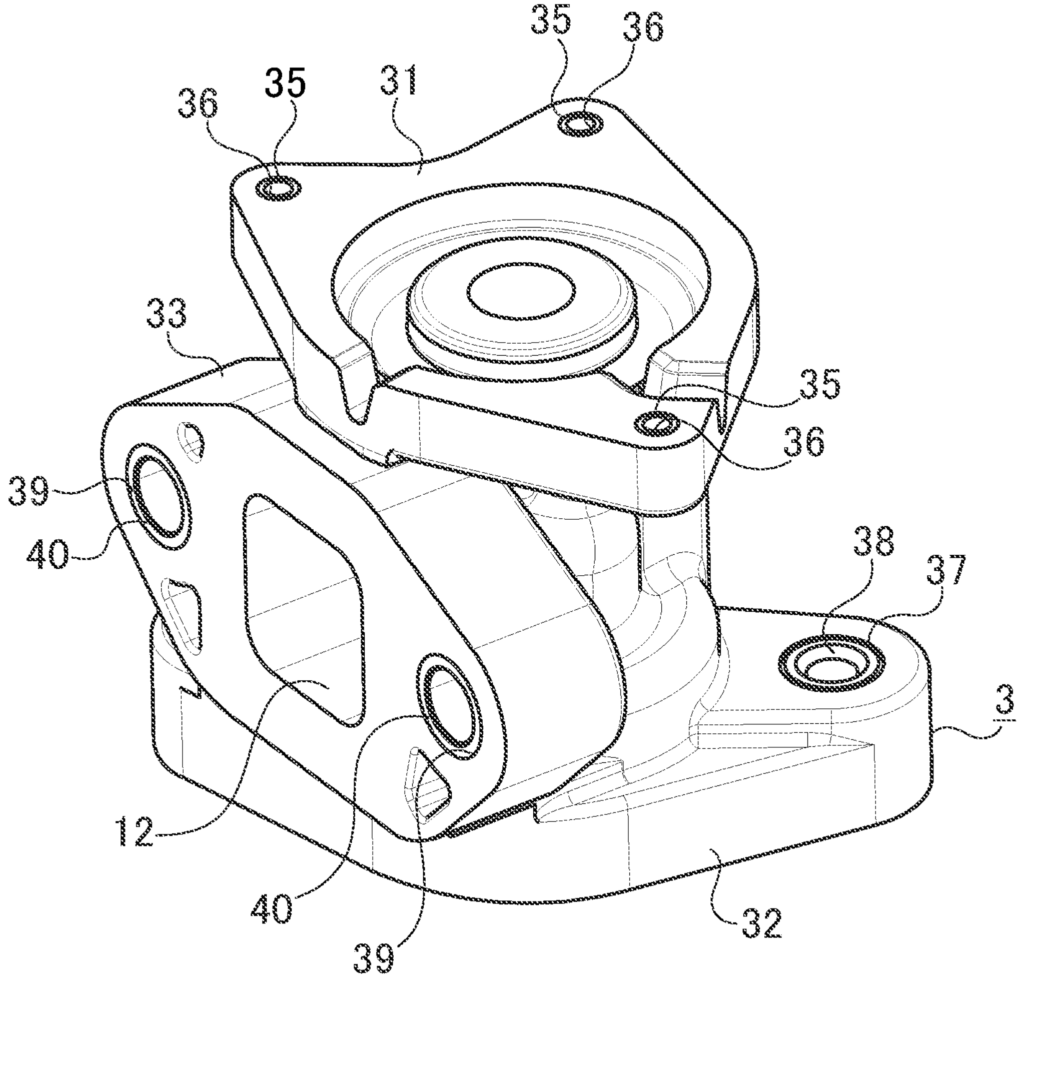
FIG. 17 is a perspective view of a housing formed of resin material in a third embodiment.

FIG. 17 is a perspective view of the housing 3 configured by the resin material. As shown in FIG. 17, on an upper side of the housing 3, a first flange 31 to be connected to the drive unit 7 is formed, and on a lower side of the housing 3, a second flange 32 to be connected to an EGR passage is formed. On a side of the outlet 12 of the housing 3, a third flange 33 to be connected to the EGR passage is formed.

Figure 18:
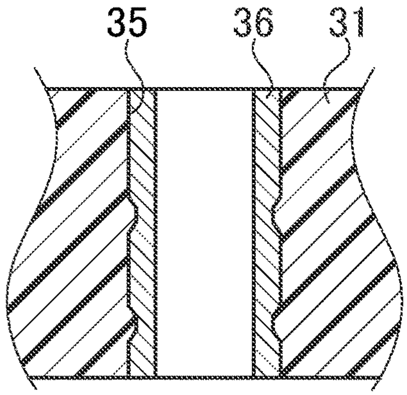
FIG. 18 is a sectional view of a part of a first bolt hole in the third embodiment.

Herein, as shown in FIG. 17, the first flange 31 is provided with a first bolt hole 35 to be inserted with a metal-made bolt for fastening with the drive unit 7. FIG. 18 is a sectional view showing a part of this first bolt bole 35. In the present embodiment, the first flange 31 is configured by the resin material, and thus the first bolt hole 35 is insert-molded with a metal-made reinforcement pipe 36 for reinforcement of the first bolt hole 35.

Figure 19:
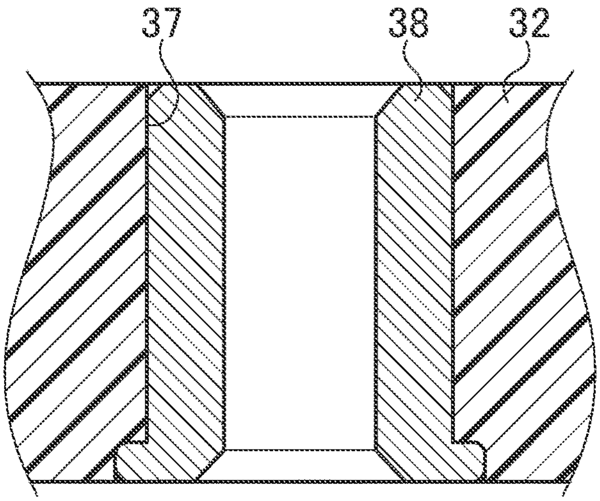
FIG. 19 is a sectional view of a part of a second bolt hole in the third embodiment.

Further, as shown FIG. 17, the second flange 32 is provided with a second bolt hole 37 to be inserted with a metal-made bolt for connection with the EGR passage. FIG. 19 is a sectional view showing a part of this second bolt hole 37. The second bolt hole 37 is also insert-molded with a metal-made reinforcement pipe 38 for reinforcement of the hole 37.

Figure 20:
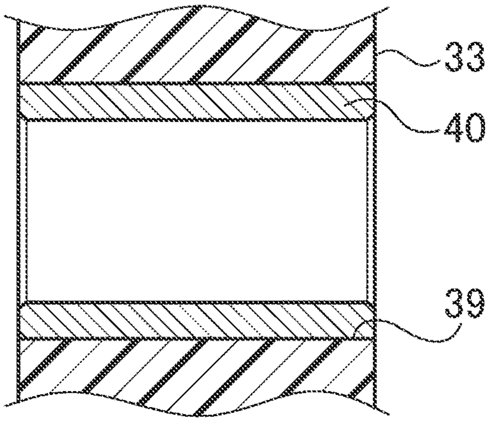
FIG. 20 is a sectional view of a part of a third bolt hole in the third embodiment.

As shown in FIG. 17, the third flange 33 is provided with a third bolt hole 39 to be inserted with a metal-made bolt for connection with the EGR passage. FIG. 20 is a sectional view of a part of this third bolt hole 39. The third bolt hole 39 is also insert-molded with a metal-made reinforcement pipe 40 for reinforcement of the hole 39.

(Operations and Effects of EGR Valve)

According to the above-explained configuration of the EGR valve 21 of the present embodiment, in addition to the operations and effects of the first embodiment, the following operations and effects can be obtained. Namely, in the present embodiment, in the housing 3 configured by the resin material, the respective bolt holes 35, 37, and 39 provided for connection with an object member (the drive unit 7 or the EGR passage) are reinforced by the metal-made reinforcement pipes 36, 38, and 40. Accordingly, even when the respective flanges 31 to 33 are fastened by metal-made bolts which are inserted in the bolt holes 35, 37, and 39, respectively, endurability of the respective bolt holes 35, 37, and 39 can be enhanced, and thus reliability of fastening in the EGR valve 21 can be improved.

Fourth Embodiment

Next, a fourth embodiment embodying an EGR valve device including an EGR valve is explained.

(Configuration of EGR Valve Device)

Figure 21:
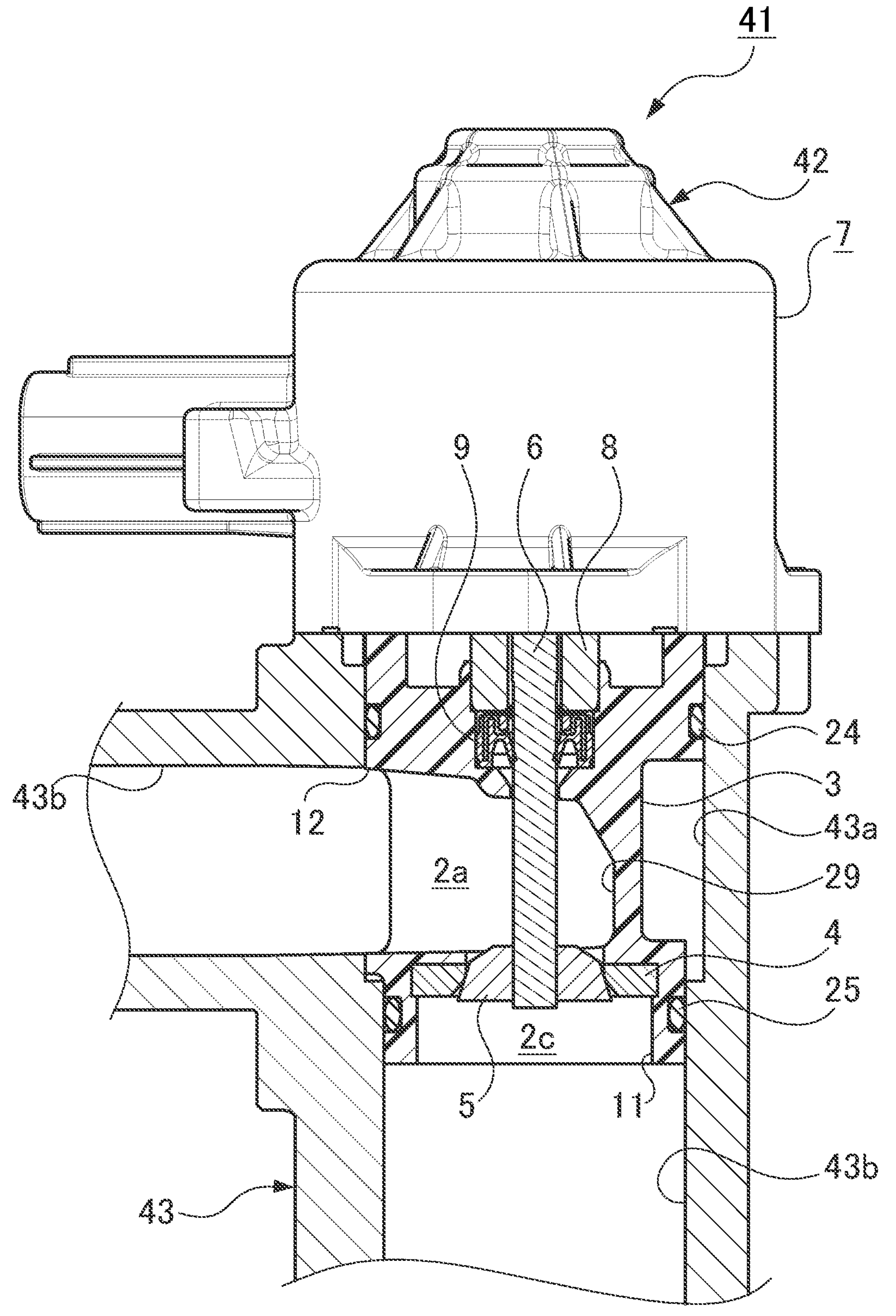
FIG. 21 is a partly cutaway front view of an EGR valve device in a fourth embodiment.
Figure 22:
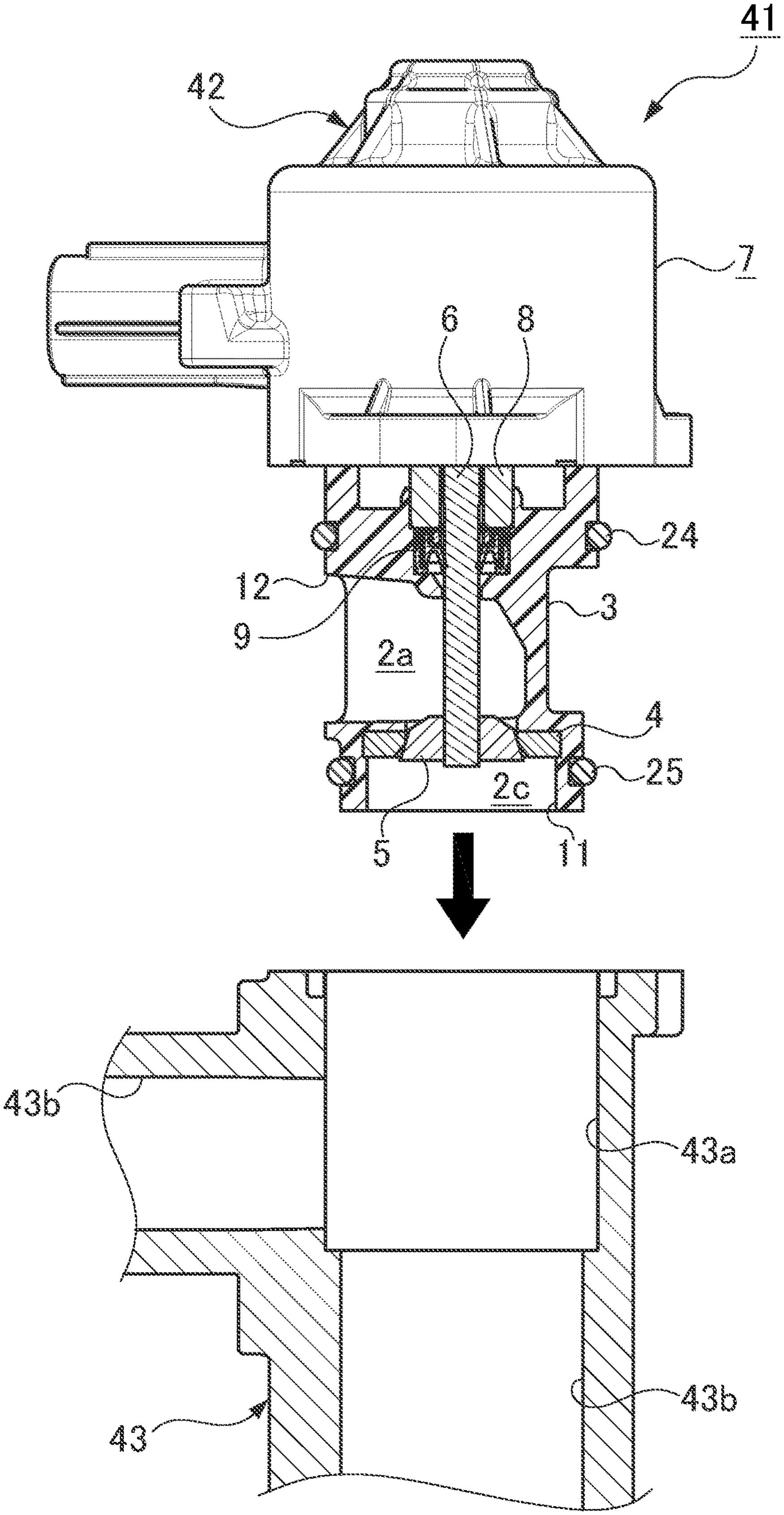
FIG. 22 is a partly exploded cutaway front view of an EGR valve and an EGR passage configuring the EGR valve device in the fourth embodiment.
Figure 23:
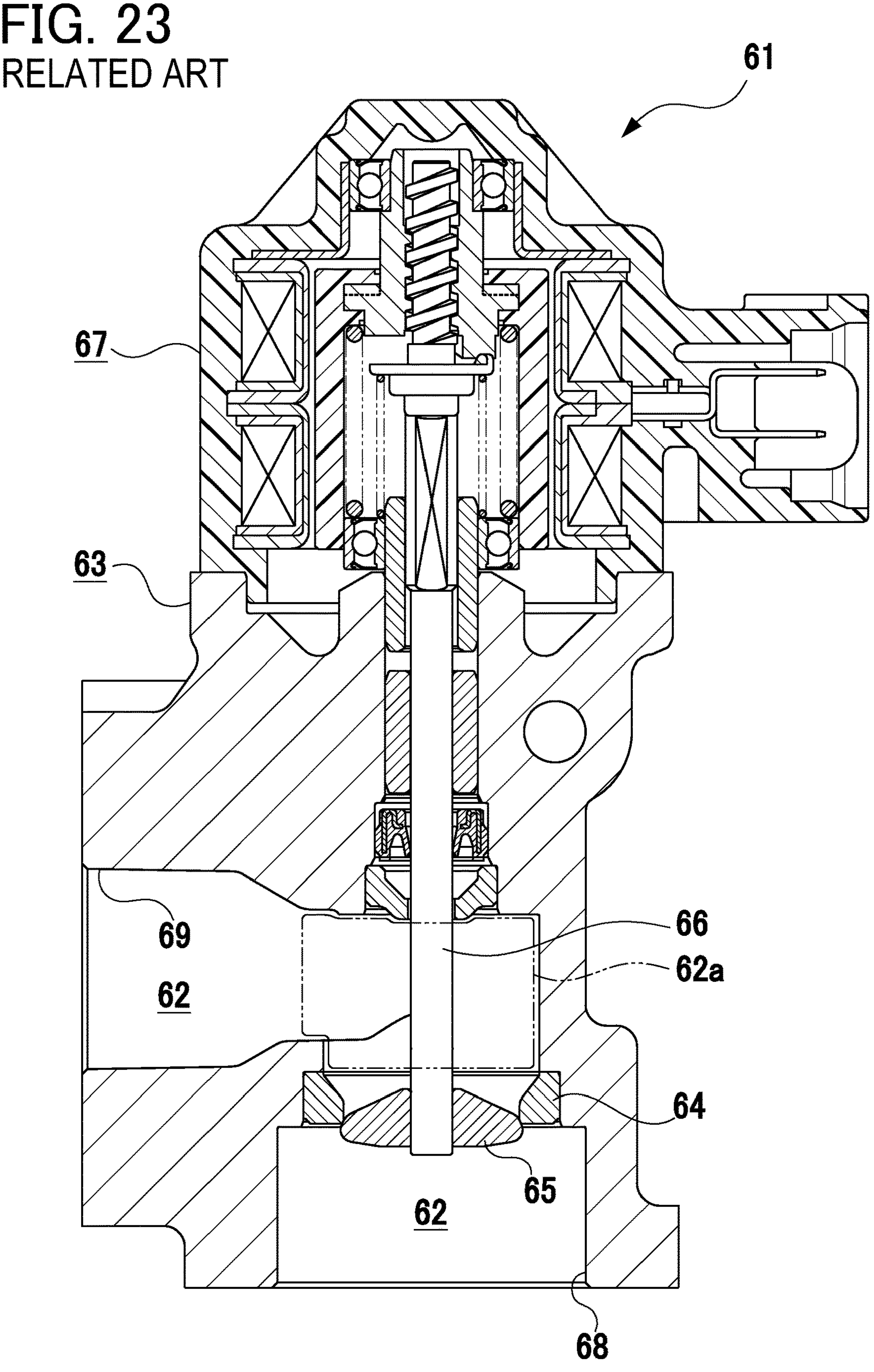
FIG. 23 RELATED ART
FIG. 23 is a sectional view of an EGR valve according to a related art.
Figure 24:
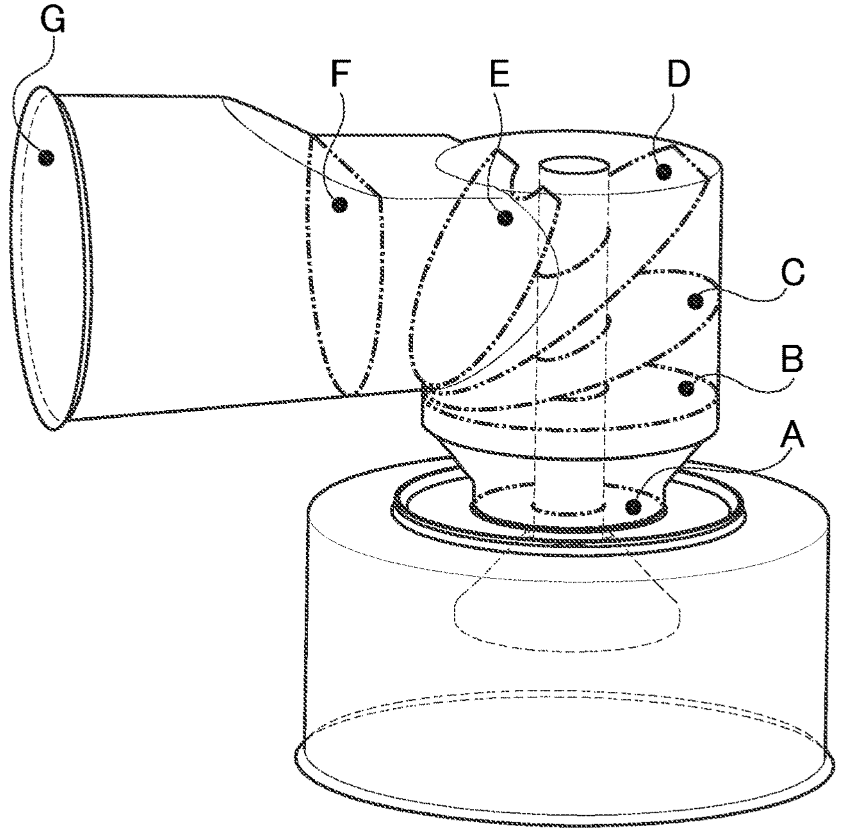
FIG. 24 RELATED ART
FIG. 24 is a perspective view showing an external view of a passage and first to seventh passage positions in a passage in the related art.
Figure 25:
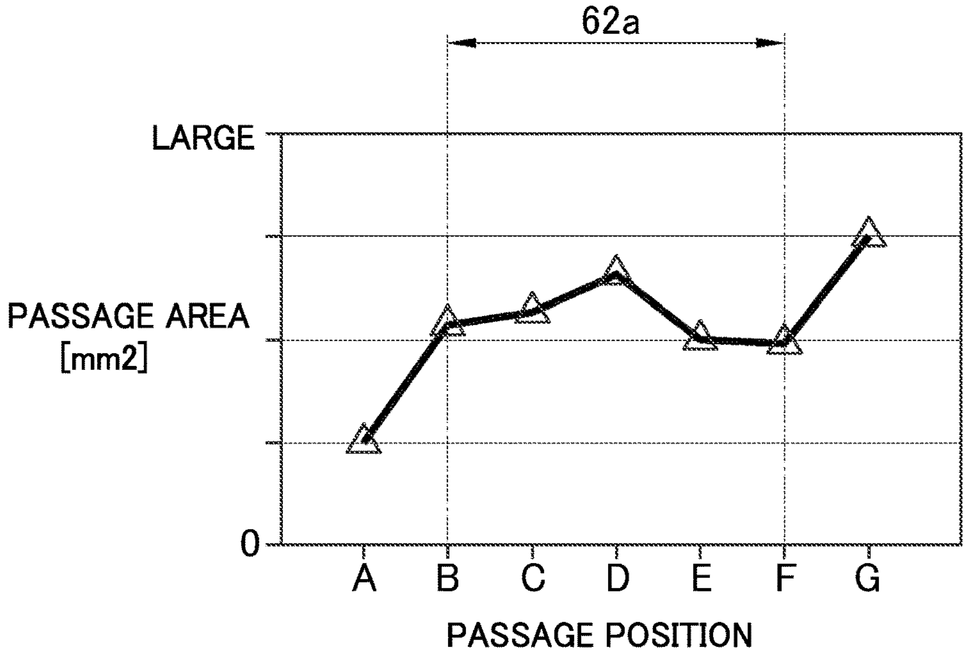
FIG. 25 RELATED ART
FIG. 25 is a graph indicating changes in passage areas in the respective passage positions in the passage shown in FIG. 24 in the related art.

FIG. 21 is a partly cutaway front view of an EGR valve device 41 of the present embodiment. FIG. 22 is a partly cutaway and exploded front view of an EGR valve 42 and an EGR passage 43 configuring the EGR valve device 41. As shown in FIG. 21, the EGR valve device 41 is provided with the EGR valve 42 and the EGR passage 43 as an object member to be assembled with the housing 3 of the EGR valve 42. The housing 3 of this EGR valve 42 is configured only with the resin-made inner housing 23 that constitutes the housing 3 in the second embodiment. The EGR passage 43 includes an assembling hole 43*a* and an other passage 43*b* through which the EGR gas flows.

This EGR valve device 41 is assembled to the EGR passage 43 in a manner that, as shown in FIG. 22, the housing 3 of the EGR valve 42 is fitted in (drop-in fitting) in the assembling hole 43*a* of the EGR passage 43. Then, under this assembled state, the inlet 11 and the outlet 12 of the housing 3 are communicated with the other passage 43*b*.

(Operations and Effects of EGR Valve Device)

According to the above-explained configuration of the EGR valve device 41 of the present embodiment, the EGR valve 42 can obtain the operations and the effects as similar to those of the second and third embodiments. In addition, according to the configuration of the present embodiment, the housing 3 of the EGR valve 42 is assembled to the assembling hole 43*a* of the EGR passage 43 (the object member), so that the EGR valve 42 is assembled to the EGR passage 43. Accordingly, an annexed configuration for assembling can be omitted from the EGR valve 42, thereby cutting a space by that annexed configuration.

Further, this EGR valve 42 can be commonized and assembled to an assembling hole of various object members. Therefore, the EGR valve 42 can achieve enlargement in the passage 2 by the amount of the cut space and also achieve improvement in multiplicity in uses of the EGR valve 42 for the various object members.

The present disclosure is not limited to the above respective embodiments and may be embodied with appropriately modifying a part of its configuration without departing from the scope of the disclosure.

(1) In the above-mentioned first embodiment, the housing 3 is configured by the resin material, but alternatively, this housing may be configured by metal material (for example, aluminum).

(2) In the above-mentioned second embodiment, the outer housing 22 is configured by the metal material and the inner housing 23 is configured by the resin material. Alternatively, both of the outer housing and the inner housing may be configured by the metal material, or both of the outer housing and the inner housing may be configured by the resin material.

(3) In the above-mentioned third embodiment, the first bolt hole 35 is reinforced by the metal-made reinforcement pipe 36, the second bolt hole 37 is reinforced by the metal-made reinforcement pipe 38, and the third bolt hole 39 is reinforced by the metal-made reinforcement pipe 50. Alternatively, the housing itself may be formed of material having high strength so that any metal-made reinforcement pipe may be omitted.

(4) In the above-mentioned fourth embodiment, the EGR valve 42 is configured to be assembled to the EGR passage 43 as the object member, but alternatively, the object member is not limited to the EGR passage, and an EGR cooler, an EGR gas distributor, and others may be adapted as the object member.

INDUSTRIAL APPLICABILITY

The present disclosure may be applied to a flow rate adjustment device that requires resistance to condensed water (acid resistance and alkali resistance) such as an EGR device provided in a gasoline engine and a diesel engine.

REFERENCE SIGNS LIST

1 EGR valve
2 Passage
2*a* Bent passage portion
2*b* Outlet passage portion
2*c* Inlet passage portion
2*d* Insertion hole
3 Housing
4 Valve seat
5 Valve element
6 Valve shaft
7 Drive unit
11 Inlet
12 Outlet
21 EGR valve
22 Outer housing
23 Inner housing
24 First sealing member
25 Second sealing member
41 EGR valve device
42 EGR valve
43 EGR passage (object member)
43*a* Assembling hole
43*b* Other passage

The invention claimed is:

1. An EGR valve of a poppet type comprising:

a housing including a passage for EGR gas;

a valve seat provided in the passage, the passage having an inlet and an outlet and including a bent passage portion bent orthogonally with respect to a direction toward the inlet downstream of the valve seat, the bent passage portion extending from a horizontal plane above the valve seat to a vertical plane that is perpendicular to the horizontal plane;

a valve shaft that passes through the bent passage portion on a downstream side of the valve seat;

a drive unit to reciprocally drive the valve shaft; and a valve element connected to one end of the valve shaft and configured to be seated on the valve seat;

wherein at each succeeding position of the bent passage portion in a downstream direction, a passage area of the bent passage portion, excluding a sectional area of the valve shaft at that position if the valve shaft passes through the passage area at that position, either (i) is kept constant relative to a preceding position of the bent passage portion or (ii) increases relative to a preceding position of the bent passage portion.

2. The EGR valve according to claim 1, wherein a portion of the bent passage portion in which the passage area increases toward the downstream direction is configured such that the passage area is gradually changed.

3. The EGR valve according to claim 1, wherein the housing is configured by resin material in at least the bent passage portion.

4. The EGR valve according to claim 1, wherein the passage downstream of the valve seat includes the bent passage portion and an outlet passage portion continuing into the outlet downstream of the bent passage portion, the housing includes the outlet passage portion, an outer housing having an insertion hole intersecting the outlet passage portion, and an inner housing fitted in the insertion hole of the outer housing and having the bent passage portion and an inlet passage portion continuing into the inlet upstream of the valve seat, and a sealing member is provided between the insertion hole of the outer housing and an outer circumference of the inner housing.

5. An EGR device comprising:

the EGR valve according to claim 1; and an object member to be assembled with the housing of the EGR valve, wherein the object member includes an assembling hole and another passage, and the inlet and the outlet of the housing are communicated with the other passage in a state in which the housing is assembled with the assembling hole of the object member.

6. The EGR valve according to claim 2, wherein the housing is configured by resin material in at least the bent passage portion.

7. The EGR valve according to claim 2, wherein the passage downstream of the valve seat includes the bent passage portion and an outlet passage portion continuing into the outlet downstream of the bent passage portion, the housing includes the outlet passage portion, an outer housing having an insertion hole intersecting the outlet passage portion, and an inner housing fitted in the insertion hole of the outer housing and having the bent passage portion and an inlet passage portion continuing into the inlet upstream of the valve seat, and a sealing member is provided between the insertion hole of the outer housing and an outer circumference of the inner housing.

8. The EGR valve according to claim 3, wherein the passage downstream of the valve seat includes the bent passage portion and an outlet passage portion continuing into the outlet downstream of the bent passage portion, the housing includes the outlet passage portion, an outer housing having an insertion hole intersecting the outlet passage portion, and an inner housing fitted in the insertion hole of the outer housing and having the bent passage portion and an inlet passage portion continuing into the inlet upstream of the valve seat, and a sealing member is provided between the insertion hole of the outer housing and an outer circumference of the inner housing.

9. The EGR valve according to claim 6, wherein the passage downstream of the valve seat includes the bent passage portion and an outlet passage portion continuing into the outlet downstream of the bent passage portion, the housing includes the outlet passage portion, an outer housing having an insertion hole intersecting the outlet passage portion, and an inner housing fitted in the insertion hole of the outer housing and having the bent passage portion and an inlet passage portion continuing into the inlet upstream of the valve seat, and a sealing member is provided between the insertion hole of the outer housing and an outer circumference of the inner housing.

10. An EGR device comprising:

the EGR valve according to claim 2; and an object member to be assembled with the housing of the EGR valve, wherein the object member includes an assembling hole and a another passage, and the inlet and the outlet of the housing are communicated with the other passage in a state in which the housing is assembled with the assembling hole of the object member.

11. An EGR device comprising:

the EGR valve according to claim 3; and an object member to be assembled with the housing of the EGR valve, wherein the object member includes an assembling hole and another passage, and the inlet and the outlet of the housing are communicated with the other passage in a state in which the housing is assembled with the assembling hole of the object member.

12. An EGR device comprising:

the EGR valve according to claim 6; and an object member to be assembled with the housing of the EGR valve, wherein the object member includes an assembling hole and another passage, and the inlet and the outlet of the housing are communicated with the other passage in a state in which the housing is assembled with the assembling hole of the object member.

13. An EGR device comprising:

the EGR valve according to claim 4; and an object member to be assembled with the housing of the EGR valve, wherein the object member includes an assembling hole and another passage, and the inlet and the outlet of the housing are communicated with the other passage in a state in which the housing is assembled with the assembling hole of the object member.

14. An EGR device comprising:

the EGR valve according to claim 7; and an object member to be assembled with the housing of the EGR valve, wherein the object member includes an assembling hole and another passage, and the inlet and the outlet of the housing are communicated with the other passage in a state in which the housing is assembled with the assembling hole of the object member.

15. An EGR device comprising:

the EGR valve according to claim 8; and an object member to be assembled with the housing of the EGR valve, wherein the object member includes an assembling hole and another passage, and the inlet and the outlet of the housing are communicated with the other passage in a state in which the housing is assembled with the assembling hole of the object member.

16. An EGR device comprising:

the EGR valve according to claim 9; and an object member to be assembled with the housing of the EGR valve, wherein the object member includes an assembling hole and another passage, and the inlet and the outlet of the housing are communicated with the other passage in a state in which the housing is assembled with the assembling hole of the object member.

* * * * *